United States Patent
Qiu et al.

(10) Patent No.: US 10,389,274 B2
(45) Date of Patent: Aug. 20, 2019

(54) BOOSTED OUTPUT INVERTER FOR ELECTRONIC DEVICES

(71) Applicant: Apple Inc., Cupertino, CA (US)

(72) Inventors: Weihong Qiu, San Ramon, CA (US); Rohan Dayal, Daly City, CA (US); Zaki Moussaoui, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/829,610

(22) Filed: Dec. 1, 2017

(65) Prior Publication Data

US 2018/0294742 A1    Oct. 11, 2018

Related U.S. Application Data

(60) Provisional application No. 62/483,222, filed on Apr. 7, 2017.

(51) Int. Cl.
*H02M 3/155* (2006.01)
*H02M 7/537* (2006.01)
(Continued)

(52) U.S. Cl.
CPC ............ *H02M 7/537* (2013.01); *H01F 38/14* (2013.01); *H02J 50/12* (2016.02); *H02M 2007/4815* (2013.01)

(58) Field of Classification Search
CPC .......... H02M 7/42; H02M 7/44; H02M 7/537; H02M 2007/4815; H02M 3/155–3/158; H02M 3/1582; H02M 3/3155
(Continued)

(56) References Cited

U.S. PATENT DOCUMENTS 4,268,899 A    5/1981 Rokas
5,293,308 A    3/1994 Boys et al.
(Continued)

FOREIGN PATENT DOCUMENTS

CN    1826715    8/2006
CN    101243374    8/2006
(Continued)

OTHER PUBLICATIONS

U.S. Appl. No. 15/467,998, filed Mar. 23, 2017, Bentov et al.
(Continued)

*Primary Examiner* — Adolf D Berhane
(74) *Attorney, Agent, or Firm* — Brownstein Hyatt Farber Schreck, LLP

(57) ABSTRACT

A power converter can be implemented with a boosted-output inverter, which integrates the functionality of a voltage converter (e.g., boost converter) and a voltage inverter. In particular, a boosted-output inverter includes a primary tank inductor coupled in series with a secondary tank inductor at a central node. The boosted-output inverter also includes two voltage-controlled switches that respectively define a charging phase and a discharging phase of the primary tank inductor. While the primary tank inductor is charging, the secondary tank inductor is inverted to ground. In this manner, current though the secondary tank inductor alternates at a voltage boosted by the fly-back voltage of the primary tank inductor exhibited when the primary tank inductor transitions from the charging mode to the discharging mode. In many cases, the secondary tank inductor is a transmit coil of a transmitter of a wireless power transfer system.

19 Claims, 8 Drawing Sheets

(51) Int. Cl.
*H01F 38/14* (2006.01)
*H02J 50/12* (2016.01)
*H02M 7/48* (2007.01)

(58) Field of Classification Search
USPC ..... 363/21.02, 123, 131, 132; 323/273, 282, 323/283
See application file for complete search history.

(56) References Cited

U.S. PATENT DOCUMENTS

| | | | |
|---|---|---|---|
| 5,479,486 A | 12/1995 | Saji | |
| 5,639,989 A | 6/1997 | Higgins, III | |
| 6,198,260 B1 * | 3/2001 | Wittenbreder | H02M 3/158 323/271 |
| 6,960,968 B2 | 11/2005 | Odenaal et al. | |
| 6,972,543 B1 | 12/2005 | Wells | |
| 7,641,358 B1 | 1/2010 | Smith et al. | |
| 7,893,564 B2 | 2/2011 | Bennett | |
| 7,948,208 B2 | 5/2011 | Partovi et al. | |
| 7,952,322 B2 | 5/2011 | Partovi et al. | |
| 8,024,491 B1 | 9/2011 | Wright et al. | |
| 8,054,651 B2 | 11/2011 | Pollard | |
| 8,169,151 B2 | 5/2012 | Kimura | |
| 8,169,185 B2 | 5/2012 | Partovi et al. | |
| 8,274,178 B2 | 9/2012 | Tucker | |
| 8,278,784 B2 | 10/2012 | Cook | |
| 8,329,376 B2 | 11/2012 | Kitamura et al. | |
| 8,332,547 B2 | 12/2012 | Sugaya | |
| 8,362,744 B2 | 1/2013 | Terao et al. | |
| 8,421,274 B2 | 4/2013 | Son et al. | |
| 8,446,046 B2 | 5/2013 | Fells et al. | |
| 8,482,250 B2 | 7/2013 | Soar | |
| 8,629,652 B2 | 1/2014 | Partovi et al. | |
| 8,629,654 B2 | 1/2014 | Partovi et al. | |
| 8,663,106 B2 | 3/2014 | Stivoric | |
| 8,716,974 B2 | 5/2014 | Sakoda et al. | |
| 8,742,625 B2 | 6/2014 | Baarman et al. | |
| 8,810,071 B2 | 8/2014 | Sauerlaender et al. | |
| 8,853,892 B2 | 10/2014 | Fells et al. | |
| 8,884,469 B2 | 11/2014 | Lemmens | |
| 8,890,470 B2 | 11/2014 | Partovi et al. | |
| 8,896,264 B2 | 11/2014 | Partovi | |
| 8,901,881 B2 | 12/2014 | Partovi et al. | |
| 8,922,525 B2 | 12/2014 | Chen et al. | |
| 8,947,047 B2 | 2/2015 | Partovi et al. | |
| 9,018,904 B2 | 4/2015 | Seyerle et al. | |
| 9,030,421 B2 | 5/2015 | Tseng et al. | |
| 9,041,346 B2 | 5/2015 | Nakama | |
| 9,048,682 B2 | 6/2015 | Lee et al. | |
| 9,057,753 B2 | 6/2015 | Nakano et al. | |
| 9,093,857 B2 | 7/2015 | Sakai et al. | |
| 9,099,867 B2 | 8/2015 | Park | |
| 9,099,885 B2 | 8/2015 | Kamata | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,124,112 B2 | 9/2015 | Havass et al. | |
| 9,126,490 B2 | 9/2015 | Cook | |
| 9,148,201 B2 | 9/2015 | Kallal et al. | |
| 9,154,189 B2 | 10/2015 | Von Novak et al. | |
| 9,160,180 B2 | 10/2015 | Suzuki et al. | |
| 9,178,369 B2 | 11/2015 | Partovi | |
| 9,197,065 B2 | 11/2015 | Divan et al. | |
| 9,197,070 B2 | 11/2015 | Jung | |
| 9,197,082 B1 | 11/2015 | Zhang | |
| 9,231,411 B2 | 1/2016 | Baarman et al. | |
| 9,270,138 B2 | 2/2016 | Yamakawa et al. | |
| 9,276,437 B2 | 3/2016 | Partovi et al. | |
| 9,318,915 B2 | 4/2016 | Miller et al. | |
| 9,325,200 B2 | 4/2016 | Nishiwaki | |
| 9,352,661 B2 | 5/2016 | Keeling et al. | |
| 9,356,659 B2 | 5/2016 | Partovi | |
| 9,376,027 B2 | 6/2016 | Harris | |
| 9,407,107 B2 | 8/2016 | Park et al. | |
| 9,410,823 B2 | 8/2016 | Widmer et al. | |
| 9,444,266 B2 | 9/2016 | Van Wageningen et al. | |
| 9,460,846 B2 | 10/2016 | Graham et al. | |
| 9,461,501 B2 | 10/2016 | Partovi et al. | |
| 9,461,502 B2 | 10/2016 | Lee | |
| 9,496,731 B2 | 11/2016 | Park et al. | |
| 9,496,732 B2 | 11/2016 | Partovi et al. | |
| 9,507,447 B2 | 11/2016 | Yilmaz | |
| 9,509,374 B2 | 11/2016 | Kim et al. | |
| 9,515,514 B2 | 12/2016 | Lee et al. | |
| 9,537,353 B1 | 1/2017 | Bossetti et al. | |
| 9,553,485 B2 | 1/2017 | Singh et al. | |
| 9,564,776 B2 | 2/2017 | Lampinen | |
| 9,577,440 B2 | 2/2017 | Partovi et al. | |
| 9,627,913 B2 | 4/2017 | Maugars | |
| 9,685,802 B1 | 6/2017 | Mirov | |
| 9,685,814 B1 | 6/2017 | Moyer et al. | |
| 9,698,761 B2 | 7/2017 | Waffenschmidt et al. | |
| 9,722,447 B2 | 8/2017 | Partovi | |
| 9,755,534 B2 | 9/2017 | Mao | |
| 9,760,195 B2 | 9/2017 | Krah et al. | |
| 9,768,643 B2 | 9/2017 | Kanno et al. | |
| 9,793,761 B2 | 10/2017 | Sampei et al. | |
| 9,800,076 B2 | 10/2017 | Jadidian et al. | |
| 9,811,204 B2 | 11/2017 | Sauer et al. | |
| 9,813,041 B1 | 11/2017 | Ritter | |
| 9,831,787 B1 * | 11/2017 | Halberstadt | H02M 3/33546 |
| 9,958,904 B2 | 5/2018 | von Badinski et al. | |
| 10,027,185 B2 | 7/2018 | Moyer | |
| 10,032,557 B1 | 7/2018 | Bossetti | |
| 2001/0044588 A1 | 11/2001 | Mault | |
| 2006/0238449 A1 * | 10/2006 | Chen | G09G 3/2965 345/60 |
| 2008/0284609 A1 | 11/2008 | Rofougaran | |
| 2009/0146608 A1 | 6/2009 | Lee | |
| 2010/0134194 A1 * | 6/2010 | Moiraghi | H03B 5/06 331/116 M |
| 2010/0201315 A1 | 8/2010 | Oshimi et al. | |
| 2010/0328044 A1 | 12/2010 | Waffenschmidt et al. | |
| 2011/0050164 A1 | 3/2011 | Partovi et al. | |
| 2011/0109264 A1 | 5/2011 | Choi | |
| 2011/0198937 A1 | 8/2011 | Tseng | |
| 2011/0221387 A1 | 9/2011 | Steigerwald et al. | |
| 2011/0234012 A1 | 9/2011 | Yi et al. | |
| 2011/0241615 A1 | 10/2011 | Yeh | |
| 2011/0254379 A1 | 10/2011 | Madawala | |
| 2011/0302078 A1 | 12/2011 | Failing | |
| 2012/0068550 A1 | 3/2012 | De Boer et al. | |
| 2012/0169139 A1 | 7/2012 | Kudo | |
| 2012/0255039 A1 | 10/2012 | Sipes | |
| 2012/0313577 A1 | 12/2012 | Moes et al. | |
| 2013/0093388 A1 | 4/2013 | Partovi | |
| 2013/0099563 A1 | 4/2013 | Partovi et al. | |
| 2013/0101127 A1 | 4/2013 | Buchmann | |
| 2013/0214909 A1 | 8/2013 | Meijers et al. | |
| 2013/0260677 A1 | 10/2013 | Partovi | |
| 2013/0271069 A1 | 10/2013 | Partovi | |
| 2013/0285605 A1 | 10/2013 | Partovi | |
| 2013/0300204 A1 | 11/2013 | Partovi | |
| 2013/0300209 A1 * | 11/2013 | Long | H02J 50/12 307/104 |
| 2013/0334326 A1 | 12/2013 | Shan | |
| 2014/0015327 A1 | 1/2014 | Keeling et al. | |
| 2014/0035378 A1 | 2/2014 | Kesler et al. | |
| 2014/0129010 A1 | 5/2014 | Garg | |
| 2014/0159656 A1 | 6/2014 | Riehl | |
| 2014/0191568 A1 | 7/2014 | Partovi | |
| 2014/0197687 A1 | 7/2014 | Lin | |
| 2014/0197782 A1 | 7/2014 | Graf et al. | |
| 2014/0266018 A1 | 9/2014 | Carobolante | |
| 2014/0306654 A1 | 10/2014 | Partovi | |
| 2014/0347007 A1 | 11/2014 | Kee et al. | |
| 2015/0001950 A1 | 1/2015 | Chung et al. | |
| 2015/0022194 A1 | 1/2015 | Almalki | |
| 2015/0035372 A1 | 2/2015 | Aioanei | |
| 2015/0078053 A1 * | 3/2015 | Harrison | H02M 5/297 363/132 |
| 2015/0280455 A1 | 3/2015 | Bosshard et al. | |

(56) References Cited

U.S. PATENT DOCUMENTS

| | | | |
|---|---|---|---|
| 2015/0130412 A1 | 5/2015 | Partovi | |
| 2015/0207333 A1 | 7/2015 | Baarman et al. | |
| 2015/0214750 A1 | 7/2015 | Moshkovich et al. | |
| 2015/0215006 A1 | 7/2015 | Mehas et al. | |
| 2015/0244179 A1 | 8/2015 | Ritter et al. | |
| 2015/0244341 A1 | 8/2015 | Ritter et al. | |
| 2015/0270058 A1 | 9/2015 | Golko et al. | |
| 2015/0333530 A1 | 11/2015 | Moyer et al. | |
| 2015/0349538 A1 | 12/2015 | Agostinelli et al. | |
| 2015/0364931 A1 | 12/2015 | Ren et al. | |
| 2016/0043567 A1 | 2/2016 | Matumoto et al. | |
| 2016/0049796 A1* | 2/2016 | Cho | H04B 5/0037 307/104 |
| 2016/0056664 A1 | 2/2016 | Partovi | |
| 2016/0064948 A1 | 3/2016 | Heresztyn et al. | |
| 2016/0064992 A1 | 3/2016 | Herbst et al. | |
| 2016/0072306 A1 | 3/2016 | Tsuda | |
| 2016/0111888 A1* | 4/2016 | Cho | H02J 5/005 307/104 |
| 2016/0127672 A1 | 5/2016 | Kamide et al. | |
| 2016/0172894 A1 | 6/2016 | Khripkov et al. | |
| 2016/0181849 A1 | 6/2016 | Govindaraj | |
| 2016/0211750 A1* | 7/2016 | Coleman | H02M 1/15 |
| 2016/0261137 A1 | 9/2016 | Riehl | |
| 2016/0285278 A1 | 9/2016 | Mehas et al. | |
| 2017/0012463 A1 | 1/2017 | Lynch | |
| 2017/0089959 A1 | 3/2017 | Ito et al. | |
| 2017/0093217 A1* | 3/2017 | Cho | H02J 7/025 |
| 2017/0110911 A1 | 4/2017 | Bossetti et al. | |
| 2017/0222493 A1 | 8/2017 | Oki et al. | |
| 2018/0013312 A1 | 1/2018 | Moyer et al. | |
| 2018/0062443 A1* | 3/2018 | Cho | H02J 50/12 |
| 2018/0233955 A1* | 8/2018 | Park | H02J 50/12 |
| 2018/0294682 A1 | 10/2018 | Qiu et al. | |
| 2019/0006892 A1 | 1/2019 | Heresztyn et al. | |
| 2019/0020213 A1 | 1/2019 | Moyer et al. | |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102055250 | 5/2011 |
| CN | 102113195 | 6/2011 |
| CN | 102124624 | 7/2011 |
| CN | 102257696 | 11/2011 |
| CN | 102355035 | 2/2012 |
| CN | 102396132 | 3/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| CN | 104037750 | 9/2014 |
| EP | 1633122 | 8/2005 |
| EP | 2642628 | 9/2013 |
| GB | 2484999 | 5/2012 |
| JP | H06311658 | 4/1994 |
| JP | H06268565 | 9/1994 |
| JP | H08149608 | 6/1996 |
| JP | H08331850 | 12/1996 |
| JP | H10173741 | 6/1998 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014023281 | 3/2014 |
| JP | 2014193087 | 10/2014 |
| KR | 1020070023337 | 2/2007 |
| KR | 1020120097155 | 9/2012 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/011905 | 1/2013 |
| WO | WO 13/122625 | 8/2013 |
| WO | WO 14/034966 | 3/2014 |
| WO | WO 15/102113 | 7/2015 |
| WO | WO 16/024869 | 2/2016 |

OTHER PUBLICATIONS

U.S. Appl. No. 15/468,001, filed Mar. 23, 2017, Qiu et al.
U.S. Appl. No. 15/626,930, filed Jun. 19, 2017, Moyer et al.
U.S. Appl. No. 15/829,850, filed Dec. 1, 2017, Qiu et al.
U.S. Appl. No. 16/025,828, filed Jul. 2, 2018, Heresztyn et al.
U.S. Appl. No. 16/133,195, filed Sep. 17, 2018, Moyer et al.

* cited by examiner

BOOSTED OUTPUT INVERTER FOR ELECTRONIC DEVICES

CROSS-REFERENCE TO RELATED APPLICATION(S)

This application is a nonprovisional patent application of, and claims the benefit to, U.S. Provisional Patent Application No. 62/483,222, filed Apr. 7, 2017 and titled "Boosted-Output Inverter for Electronic Devices," the disclosure of which is hereby incorporated herein in its entirety.

FIELD

Embodiments described herein generally relate to power converters for electronic devices and, in particular, to wireless power converters adapted to receive regulated direct current and to output boosted-voltage alternating current.

BACKGROUND

An electronic device can receive electric power from a power converter. A power converter is typically configured to convert electric power received from a power source to electric power suitable for use by the electronic device.

In some cases, an electronic device may require a power converter to convert direct current to boosted-voltage alternating current. In conventional constructions, the power converter includes at least two power conversion stages, arranged in series. For example, a first stage may be an inverter stage to convert direct current to alternating current and a second stage can be a voltage converter stage to increase voltage. However, implementing a power converter in this conventional manner, with multiple independent stages in series, typically reduces the operational efficiency of the power converter as each stage introduces independent inefficiencies thereby increasing power consumption and reducing power delivered to the electronic device undesirably.

SUMMARY

Many embodiments described herein reference a power converter that incorporates a combined boost converter and inverter that is configured to receive regulated direct current and configured to output boosted-voltage alternating current. This configuration is referred to herein as a "boosted-output inverter."

A power converter with a boosted-output inverter, such as described herein, can be implemented and operated with fewer electronic components (as compared to conventional multi-stage power converter constructions) and as such, can exhibit reduced physical size, reduced conduction losses, reduced switching losses, lower manufacturing complexity, and increased operational efficiency.

In many embodiments, a boosted-output inverter includes a primary tank inductor in series with an output of a regulated direct current source. The primary tank inductor is repeatedly charged and discharged, at a selected frequency and duty cycle, by two voltage-controlled switches that respectively define a "charge phase" current loop and a "discharge phase" current loop. Current discharged from the primary tank inductor during the discharge phase (in series with current output from the regulated direct current source) is supplied to a secondary tank inductor. In this manner, the voltage across the secondary tank inductor, during the discharge phase, is boosted with respect to the regulated direct current source. Conversely, during the charge phase, the secondary tank inductor is disconnected from the primary tank inductor and connected to ground, thereby causing current through the secondary tank inductor to reverse. In this manner, voltage across the secondary tank inductor alternates at the selected frequency and is boosted higher than the voltage level of the regulated direct current source.

A boosted-output inverter can be incorporated into any number of suitable power converters or electronic devices. In many cases, the secondary tank inductor is a primary winding of an air gap transformer or a magnetic-core transformer. In one specific example, the secondary tank inductor is a transmit coil of a wireless power transfer system.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
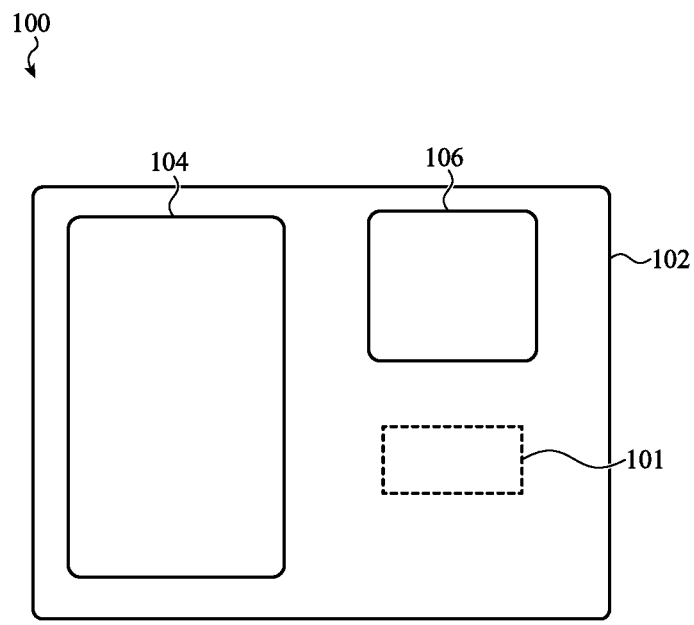
FIG. 1A depicts an electronic device that receives power from a power converter that incorporates a boosted-output inverter.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a power converter that incorporates a boosted-output inverter. The boosted-output inverter is configured to receive regulated direct current from a direct current power source (e.g., battery, capacitor, common collector or common drain supply rail, and so on) and to output alternating current at a boosted voltage level. Integrating the functionality of a voltage converter and a voltage inverter into a single circuit using the example techniques and circuit topologies described herein can reduce manufacturing and control complexity in addition to reducing power losses associated with operating the power converter.

A boosted-output inverter, such as described herein, includes a primary tank inductor connected in series with a regulated direct current source, such as a battery, a capacitor, or a power adapter terminal. The primary tank inductor is repeatedly charged and discharged, at a selected duty cycle and frequency, each of which may be fixed or may vary.

When the primary tank inductor is discharging (herein, the "discharge phase"), it is connected in series with a secondary tank inductor. As a result of this configuration, voltage across the secondary tank inductor is equal to the voltage of the regulated direct current source, boosted by the fly-back voltage across the primary tank inductor developed as a result of transitioning to the discharge phase.

When the primary tank inductor is charging (herein, the "charge phase"), the secondary tank inductor is inverted to ground, influencing a reversal of current direction through the secondary tank inductor. By repeatedly switching the primary tank inductor between the charge phase and the discharge phase, synchronously with inversion of the secondary tank inductor, current through the secondary tank inductor alternates with a peak-to-peak voltage greater than the voltage output by the regulated direct current source.

A boosted-output inverter, such as described herein, can be incorporated into any number of suitable power converters (e.g., DC-to-DC, AC-to-AC, AC-to-DC, DC-to-AC, high-voltage power conversion systems, low-voltage power conversion systems, and so on) which in turn can be incorporated into any number of suitable stationary or mobile electronic devices (e.g., wearable devices, industrial devices, home devices, vehicle devices, entertainment devices, and so on). Accordingly, it may be understood that the various methods, systems, and circuits described herein may be suitably applied, adapted, or modified in any implementation-specific manner to convert direct current to alternating current of a higher voltage, without the efficiency losses (e.g., switching losses, conduction losses, and so on) or complexities (e.g., additional required components, control signals, and so on) associated with conventional multi-stage power conversion techniques.

For simplicity of description, embodiments described herein reference an example boosted-output inverter configured for use with (or as) a transmitter of a wireless power transfer system configured to transfer power—across an air gap—from the transmitter to one or more receivers. It may be appreciated, however, that this is merely one example and that a boosted-output inverter can be incorporated into other power converter topologies—including multi-stage series topologies—which, in turn, can be incorporated into, or associated with, any number of suitable electronic devices.

For many embodiments that follow, at least one secondary tank inductor of a boosted-output inverter is configured to operate as a transmit coil of an inductive-mode or resonance-mode transmitter configured to magnetically couple to a corresponding receive coil in a receiver device positioned nearby the transmitter. The transmit coil and the receive coil may be tightly or loosely coupled.

In operation, an alternating current applied through the transmit coil (e.g., the secondary tank inductor) induces a corresponding alternating current through the receive coil that can be consumed by a load in the receiver, thereby transferring electric power from the transmitter to the receiver across the gap that separates, and isolates, them. Herein, the combination of a coupled transmit coil and receive coil is referred to as an "air gap transformer" of a "wireless power transfer system."

These and other embodiments are discussed below with reference to FIGS. 1A-6. However, those skilled in the art will readily appreciate that the detailed description given herein with respect to these figures is for explanation only and should not be construed as limiting.

Figure 1B:
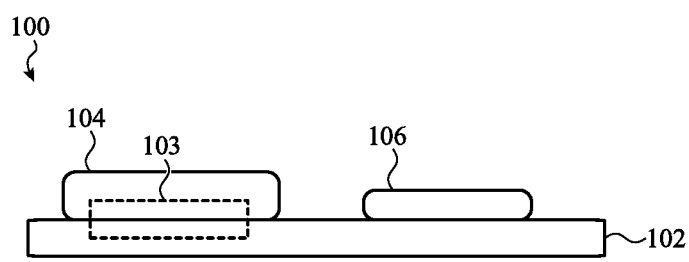
FIG. 1B depicts a side view of the embodiment depicted in FIG. 1A.

FIG. 1A depicts a wireless power transfer system 100. The wireless power transfer system 100 includes a transmitter 102 and at least one receiver. Two example receivers are identified in FIG. 1A as the receiver 104 and the receiver 106. FIG. 1B depicts a side view of the wireless power transfer system 100, specifically illustrating an example embodiment in which the transmitter 102 is accommodated in a low-profile enclosure.

As noted above, the transmitter 102 is configured to transfer power to one more receiver, such as the receiver 104 and/or the receiver 106. The transmitter 102 can transmit power to the receiver 104 and the receiver 106 (in addition to other receivers, not shown) in many ways, including, but not limited to: simultaneously, independently, or in a time-multiplexed manner.

The transmitter 102 includes a transmit coil that magnetically couples to a corresponding receive coil in a receiver, such as a first receive coil within the receiver 104 and/or a second receive coil within the receiver 106. In the illustrated embodiment, the transmitter 102 can include multiple transmit coils (not shown) distributed in an array or a regular pattern, in one or more overlapping or non-overlapping layers. As a result of this construction, the receiver 104 and the receiver 106 can be placed in substantially any position or orientation relative to the transmitter 102, while assuring that the first receive coil and the second receive coil are substantially aligned, respectively, with at least one transmit coil of the transmitter 102.

For simplicity of description, embodiments that follow reference one example configuration of the wireless power transfer system 100. In this example, power is transferred from a single transmit coil (more generally, the "transmit coil") of the transmitter 102 to a single receive coil (more generally, the "receive coil") of the receiver 104 across an air gap to define a transformer 103, which, as illustrated, is an air gap transformer 103. It may be appreciated, however, that this is merely one simplified example. In other cases, the transmitter 102 can include more than one transmit coil and/or the receiver 104 can include more than one receive coil. Further, it is appreciated that the receiver 106 may be configured in the same or similar manner as the receiver 104.

To transfer power from the transmitter 102 to the receiver 104, an alternating current is passed through the transmit coil, a corresponding alternating current is induced in the receive coil. The transmit coil and receive coil can be operated in either an inductive mode or a resonant mode and may be tightly coupled or loosely coupled.

Alternating current can be applied through the transmit coil in any number of suitable ways. In one example, the transmitter 102 includes a boosted-output inverter to convert low-voltage direct current to alternating current applied directly through to the transmit coil.

A boosted-output inverter, as noted with respect to other embodiments described herein, includes a primary tank inductor connected in series with a regulated direct current source within (or coupled) to the transmitter 102. The regulated direct current source can be any suitable direct current source, such as, but not limited to: a battery, a capacitor, a power adapter terminal, a photovoltaic cell, a generator output, or any combination thereof. In one example embodiment, the transmitter 102 is connected to an industry standard input/output port configured to supply power, such as a universal serial bus, high-definition multimedia interface, power over ethernet, and so on.

The primary tank inductor is repeatedly charged and discharged by a voltage-controlled switch (e.g., a MOSFET), at a selected duty cycle and frequency, each of which may be fixed or may vary. In many cases, the voltage-controlled switch is operated with zero-voltage switching or zero-current switching.

In the discharge phase, the primary tank inductor is connected in series with a secondary tank inductor. In this example, the secondary tank inductor is the transmit coil of the transmitter 102. As a result of this configuration, in the discharge phase, voltage across the transmit coil is equal to the voltage of the regulated direct current source, boosted by the fly-back voltage across the primary tank inductor developed as a result of transitioning from the charge phase to the discharge phase.

When the primary tank inductor is in the charge phase, the transmit coil is inverted to ground via a second voltage-controlled switch. The inversion of the transmit coil influences a reversal of current direction through the transmit coil. By repeatedly switching the primary tank inductor between the charge phase and the discharge phase, synchronously with inversion of the transmit coil to ground, current through the transmit coil alternates with a peak-to-peak voltage greater than the voltage output by the regulated direct current source. In this manner, an alternating current at boosted voltage circulates through the transmit coil which, in turn, induces a corresponding alternating current through the receive coil that can be consumed by a load in the receiver 104, thereby transferring electric power from the transmitter 102 to the receiver 104a cross the gap that separates, and isolates, them.

As noted above, integrating the functionality of a voltage converter and a voltage inverter into a single circuit can reduce manufacturing and control complexity in addition to reducing power losses associated with operating the wireless power transfer system 100.

To facilitate operation, use, and control of the transmitter 102, the transmitter 102 can also include a housing to accommodate components such as, without limitation, a processor 101, a memory, a display, a battery, a network connection, a sensor, an input/output port, an acoustic element, a haptic element, a digital and/or analog circuit (e.g., for performing and/or coordinating tasks of the wireless power transfer system 100), and so on. For simplicity of illustration, the transmitter 102 is depicted in FIG. 1A without many of these elements, each of which may be included, partially and/or entirely, within the low-profile enclosure.

To facilitate the operation, use, and control of the receiver 104, the receiver 104 includes a housing to accommodate components such as the receive coil, a processor, a memory, a display, a battery, a network connection, a sensor, an input/output port, an acoustic element, a haptic element, digital and/or analog circuits for performing and/or coordinating tasks of the wireless power transfer system 100 or another electronic device, and so on. For simplicity of illustration, the housing of the receiver 104 is depicted in FIG. 1A without many of these elements, each of which may be included, partially and/or entirely, within the housing.

The receiver 104 can be any suitable electronic device such as, but not limited to, a cellular phone, a tablet computer, a wearable electronic device (e.g., watch, pendant, bracelet, necklace, anklet, ring, and so on), a peripheral input device (e.g., keyboard, mouse, trackpad, remote control, stylus, gaming device, gesture input device, and so on), an authentication device or token, and so on.

The housing of the receiver 104 is positionable relative to an external surface of the low-profile enclosure of the transmitter 102, generally referred to as an "interface surface." The interface surface can have any suitable shape (e.g., rectilinear, circular, polygonal, and so on) or topology (e.g., planar, concave, convex, faceted, and so on). Typically, the housing of the receiver 104 is smaller than the interface surface of the low-profile enclosure of the transmitter 102, but this may not be required of all embodiments.

The foregoing embodiments depicted in FIGS. 1A-1B and the various alternatives thereof and variations thereto are presented, generally, for purposes of explanation, and to facilitate an understanding of various possible electronic devices or accessory devices that can incorporate, or be otherwise associated with, a wireless power transfer system, such as described herein. However, it will be apparent to one skilled in the art that some of the specific details presented herein may not be required in order to practice a particular described embodiment, or an equivalent thereof.

Figure 2:
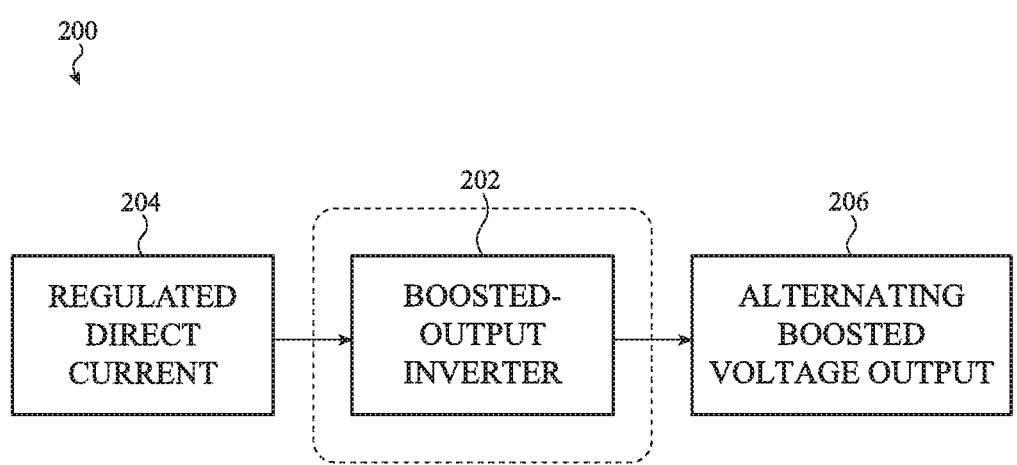
FIG. 2 is a simplified system diagram of a transmitter of a wireless power transfer system that includes a boosted-output inverter, such as described herein.

Generally and broadly, FIG. 2 depicts a simplified system diagram of a power converter 200 of a transmitter of a wireless power transfer system. It will be appreciated, however, that the depicted example is not exhaustive; the various embodiments described with reference to FIG. 2 may be modified or combined in any number of suitable or implementation-specific ways.

In particular, FIG. 2 depicts a power converter 200 which, as noted above, includes a boosted-output inverter 202. The boosted-output inverter 202 receives input from a regulated direct current source 204 and provides an alternating current output at a boosted voltage, identified in the figure as the output 206.

The boosted voltage provided by the boosted-output inverter 202 can have any suitable peak-to-peak or root-mean-squared value. In some cases, the output 206 may have a variable voltage. The voltage level of the output 206 can be controlled by a processor, analog or digital circuit, or any combination thereof.

Generally and broadly, FIGS. 3A-5 reference a simplified schematic diagram of a boosted-output inverter such as described herein. It will be appreciated, however, that the depicted example is not exhaustive; the various embodiments described with reference to these figures may be modified or combined in any number of suitable or implementation-specific ways.

The boosted-output inverter 300 includes a primary tank inductor 302, connected in series with a regulated direct current source 304. The regulated direct current source 304 supplies a substantially constant direct current voltage $V_{in}$ to an input lead of the boosted-output inverter 300. The regulated direct current source 304 can be any suitable direct current source including, but not limited to: a battery, a capacitor, or a power adapter terminal. In many cases, the regulated direct current source 304 is connected to or otherwise associated with a standardized input/output port, such as a universal serial bus.

The boosted-output inverter 300 also includes two switching elements that meet at a central node 306 defined at an output lead of the primary tank inductor 302. A first voltage-controlled switch Q1 (a "high-side" switch) is associated with the discharge phase of the primary tank inductor 302 and is identified as the discharge/boost switch 308. A second voltage-controlled switch Q2 (a "low-side" switch) is associated with the charge phase of the primary tank inductor 302 and is identified as the charge/inversion switch 310.

Typically, the discharge/boost switch 308 and the charge/inversion switch 310 are typically implemented as voltage-controlled switches such as MOSFETs (having at least a source lead, a drain lead, and a gate lead), but any suitable switching element may be used. The discharge/boost switch 308 couples the central node 306 to circuit ground via a bus capacitor 312 configured to oppose change in voltage at the central node 306 during the discharge phase of the primary tank inductor 302. The charge/inversion switch 310 couples the central node 306 directly to circuit ground. In some embodiments, the bus capacitor 312 can be referred to as an output capacitor.

As may be appreciated, the discharge/boost switch 308 and the charge/inversion switch 310 are enabled oppositely; the charge/inversion switch 310 is closed when the discharge/boost switch 308 is open (the charge phase) and the charge/inversion switch 310 is open when the discharge/boost switch 308 is closed (the discharge phase).

In many cases, a transient period may be inserted between the charge phase and the discharge phase to prevent a condition in which the discharge/boost switch 308 and the charge/inversion switch 310 are closed simultaneously.

The boosted-output inverter 300 also includes a group of resonant circuits 314, which are arranged in parallel and coupled to the central node 306. Each resonant circuit of the group of resonant circuits 314 includes a secondary tank inductor, a resonant capacitor, and a selection switch. The selection switch of each resonant circuit of the group of resonant circuits 314 can be selectively enabled to couple the associated resonant circuit to the central node 306, an operation referred to herein as "activating" the respective secondary tank inductor. In some cases, only one resonant circuit of the group of resonant circuits is coupled to the central node 306 at a particular time. In other cases, multiple resonant circuits of the group of resonant circuits can be coupled to the central node 306 simultaneously.

In one example embodiment, the group of resonant circuits 314 are associated with an array of transmit coils of a wireless power transfer system. More particularly, each resonant circuit of the group of resonant circuits 314 includes a secondary tank inductor that serves as a primary coil of an air-gap transformer.

One resonant circuit, identified as the resonant circuit 314a, includes a secondary tank inductor 316, a resonant capacitor 318, and a selection switch 320. In many cases, other resonant circuits of the group of resonant circuits 314 can be configured in the same manner as the resonant circuit 314a, but this is not required. For example, in some embodiments, different resonant circuits may be tuned to resonate at different frequencies or may be constructed with different dimensions.

As noted above, the boosted-output inverter 300 operates by rapidly switching the primary tank inductor 302 between the charge phase and the discharge phase. When the primary tank inductor 302 is in the discharge phase, such as shown in FIG. 3B, the charge/inversion switch 310 is open (Q2 is not conducting; omitted from FIG. 3B) and the discharge/boost switch 308 is closed (Q1 is conducting; depicted as a short). The secondary tank inductor 316 is connected to the central node 306 and the voltage at the central node 306, with respect to ground, is supported by the bus capacitor 312.

As a result of this configuration, the voltage across the secondary tank inductor 316 (e.g., $V_{BUS}$) is equal to the voltage of the regulated direct current source 304, boosted by the fly-back voltage across the primary tank inductor 302 developed as a result of transitioning to the discharge phase from the charge phase. The magnitude of the fly-back voltage of the primary tank inductor 302 depends upon the duty cycle (and/or frequency) at which the discharge/boost switch 308 and the charge/inversion switch 310 are operated. In this manner, the duty cycle at which the discharge/boost switch 308 and the charge/inversion switch 310 are operated directly controls the voltage $V_{Bus}$ across the secondary tank inductor 316.

Figure 3A:
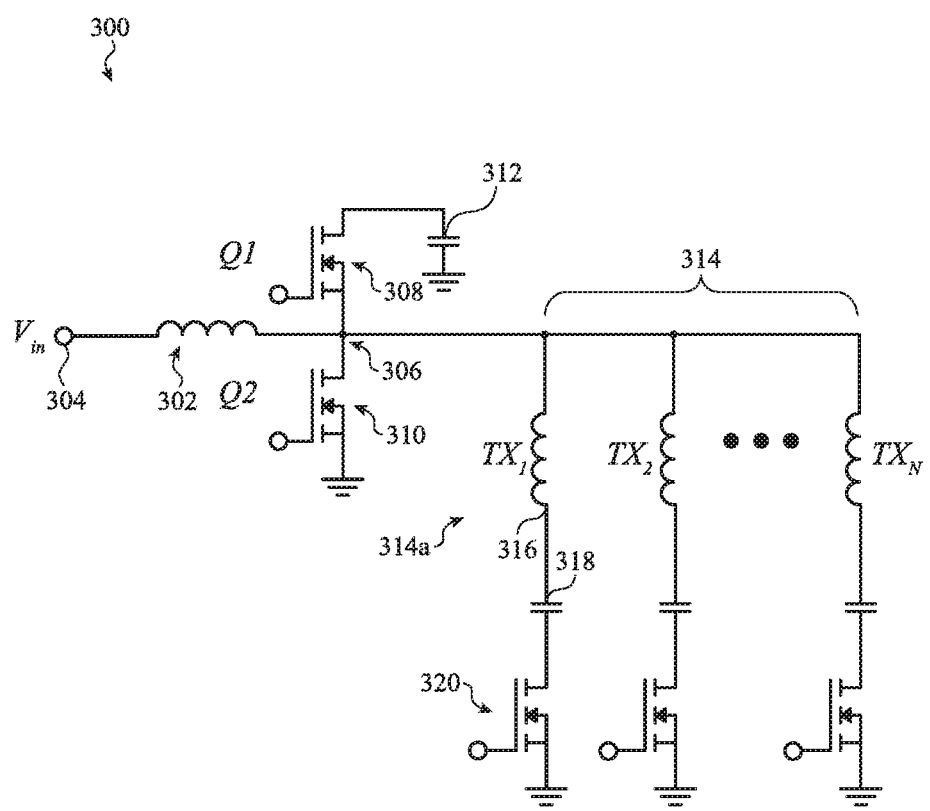
FIG. 3A is a simplified schematic diagram of a boosted-output inverter, including multiple secondary tank inductors that may be coupled to an output a shared primary tank inductor.
Figure 3B:
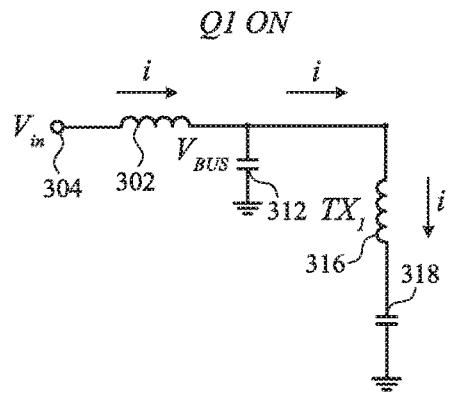
FIG. 3B depicts a further-simplified schematic diagram of the boosted-output inverter of FIG. 3A, simplified to illustrate current flow through the inverter when the shared primary tank inductor is discharging current through a selected secondary tank inductor.
Figure 3C:
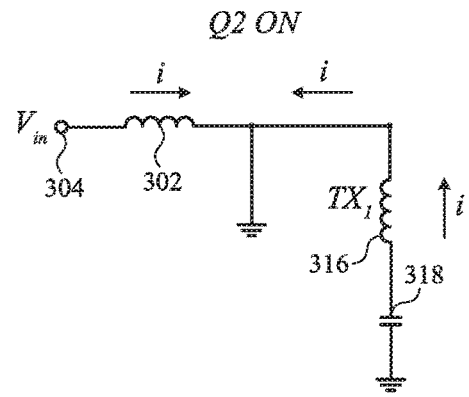
FIG. 3C depicts another further-simplified schematic diagram of the boosted-output inverter of FIG. 3A, simplified to illustrate current flow through the inverter when the shared primary tank inductor is charging.

Alternatively, when the primary tank inductor 302 is in the charge phase, such as shown in FIG. 3C, the charge/inversion switch 310 is closed (Q2 is conducting; depicted as a short) and the discharge/boost switch 308 is open (Q1 is not conducting; omitted from FIG. 3C). The secondary tank inductor 316 is connected to ground via the charge/inversion switch 310 and, additionally, the primary tank inductor 302 is connected t-8o ground via the charge/inversion switch 310.

The operation of connecting the secondary tank inductor 316 to ground via the charge/inversion switch 310 inverts the polarity of the secondary tank inductor 316 and, as a result, current through the secondary tank inductor 316 reverses. Similarly, the operation of connecting the primary tank inductor 302 to ground via the charge/inversion switch 310 causes current through the primary tank inductor 302 to increase.

In this manner, by repeatedly switching the primary tank inductor 302 between the charge phase and the discharge phase, synchronously with inversion of the secondary tank inductor 316, current through the secondary tank inductor 316 alternates with a peak-to-peak voltage (approximately equal to twice the bus voltage $V_{BUS}$) that is greater than the voltage output by the regulated direct current source 304.

Figure 4A:
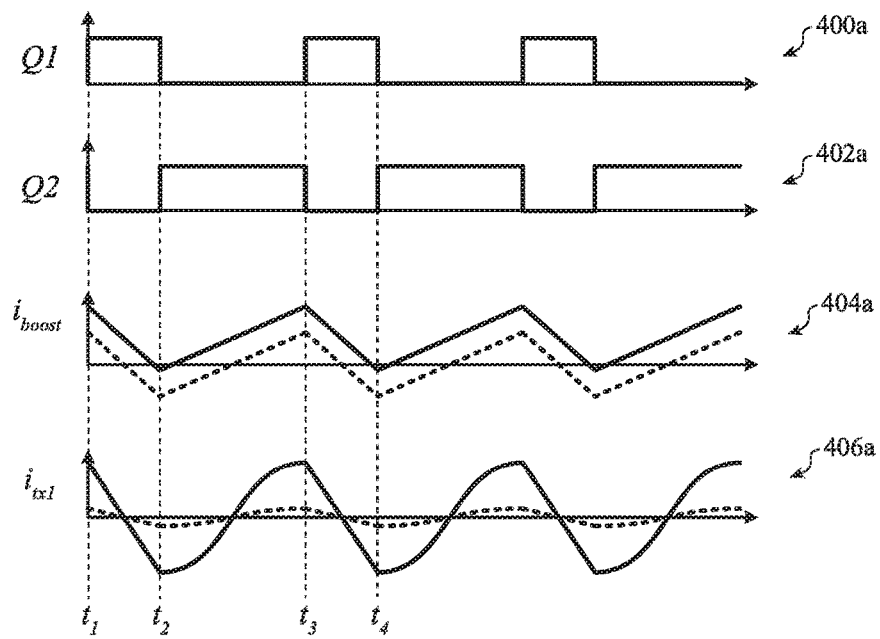
FIG. 4A depicts a set of current and voltage waveforms associated with steady-state operation of the boosted-output inverter of FIG. 3A.

FIG. 4A depicts a set of current and voltage waveforms associated with steady-state operation—at a selected duty cycle of approximately twenty-five percent—of the boosted-output inverter of FIG. 3A. In particular, a voltage waveform 400a is depicted and corresponds to a control signal that may be applied to the discharge/boost switch 308 to initiate the discharge phase of the primary tank inductor 302 (e.g., at time $t_1$ and time $t_3$). Similarly, a voltage waveform 402a is depicted and corresponds to a control signal that may be applied to the charge/inversion switch 310 to initiate the discharge phase of the primary tank inductor 302 (e.g., at time $t_2$ and time $t_4$).

A current waveform 404a is also depicted and corresponds to current through the primary tank inductor 302 during the charging phase (e.g., from time $t_2$ to time $t_3$) and during the discharging phase (e.g., from time $t_1$ to time $t_2$ and from time $t_3$ to time $t_4$). The current waveform 404a is depicted under two conditions, a first condition—depicted as a solid line—corresponds to a high load condition in which current through the secondary tank inductor 316 is high. A second condition—depicted as a dotted line—corresponds to a low load condition in which current through the secondary tank inductor 316 is low. In many cases, the current through the primary tank inductor 302 can be used as a trigger—either directly or indirectly—to facilitate zero-voltage switching or zero-current switching of either or both the discharge/boost switch 308 and the charge/inversion switch 310.

A current waveform 404b is also depicted and corresponds to current through the secondary tank inductor 316 during the charging phase of the primary tank inductor 302 (e.g., from time $t_2$ to time $t_3$) and during the discharging phase of the primary tank inductor 302 (e.g., from time $t_1$ to time $t_2$ and from time $t_3$ to time $t_4$). The current waveform 404b is depicted under two conditions, a first condition—depicted as a solid line—corresponds to a high load condition in which current through the secondary tank inductor 316 is high. A second condition—depicted as a dotted line—corresponds to a low load condition in which current through the secondary tank inductor 316 is low.

In this example, the discharge phase of the primary tank inductor 302 is approximately one third of the charge phase of the primary tank inductor 302. In other words, the primary tank inductor 302 is operated at, approximately, a twenty-five percent duty cycle.

Figure 4B:
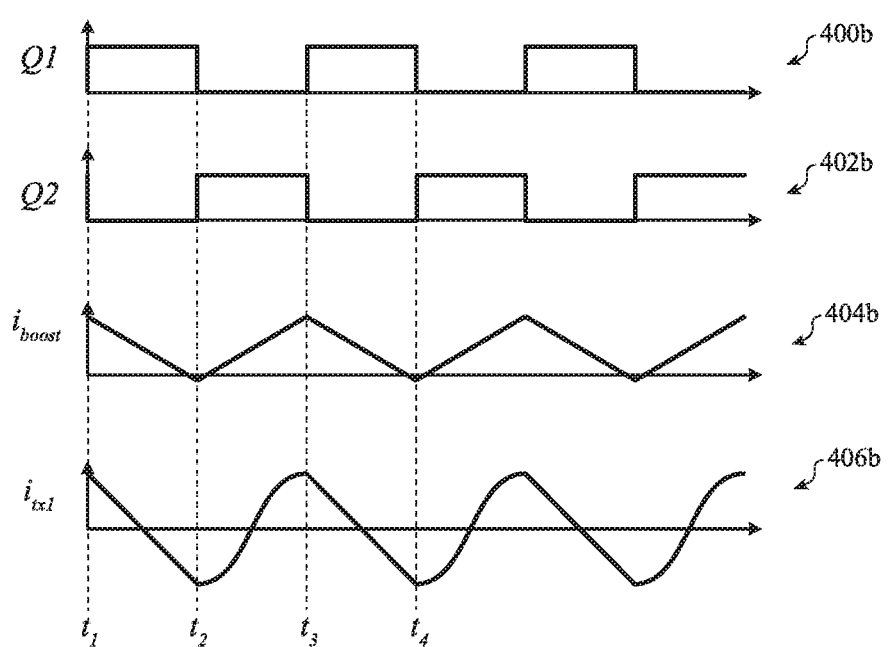
FIG. 4B depicts a different set of current and voltage waveforms associated with steady state operation of the boosted-output inverter of FIG. 3A.

FIG. 4B depicts a different set of current and voltage waveforms associated with steady-state operation—at a selected duty cycle of approximately fifty percent—of the boosted-output inverter of FIG. 3A. As with the voltage and current waveforms depicted in FIG. 4A, a voltage waveform 400b is depicted and corresponds to a control signal that may be applied to the discharge/boost switch 308 to initiate the discharge phase of the primary tank inductor 302 (e.g., at time $t_1$ and time $t_3$). Similarly, a voltage waveform 402b is depicted and corresponds to a control signal that may be applied to the charge/inversion switch 310 to initiate the discharge phase of the primary tank inductor 302 (e.g., at time $t_2$ and time $t_4$).

A current waveform 404b is also depicted and corresponds to current through the primary tank inductor 302 during the charging phase (e.g., from time $t_2$ to time $t_3$) and during the discharging phase (e.g., from time $t_1$ to time $t_2$ and from time $t_3$ to time $t_4$). The current waveform 404b corresponds to a low load condition in which current through the secondary tank inductor 316 is high.

A current waveform 404b is also depicted and corresponds to current through the secondary tank inductor 316 during the charging phase of the primary tank inductor 302 (e.g., from time $t_2$ to time $t_3$) and during the discharging phase of the primary tank inductor 302 (e.g., from time $t_1$ to time $t_2$ and from time $t_3$ to time $t_4$). The current waveform 404b corresponds to a low load condition in which current through the secondary tank inductor 316 is high.

In this example, the discharge phase of the primary tank inductor 302 is approximately one third of the charge phase of the primary tank inductor 302. In other words, the primary tank inductor 302 is operated at, approximately, a fifty percent duty cycle.

As shown in FIGS. 4A-4B, the selected duty cycle at which the discharge/boost switch 308 and the charge/inversion switch 310 are operated effects the voltage across the secondary tank inductor 316 and the current through the secondary tank inductor 316. As such, the duty cycle at which the discharge/boost switch 308 and the charge/inversion switch 310 are operated effects the power output from the secondary tank inductor 316. More specifically, if the secondary tank inductor 316 is used as a transmit coil of a wireless power transfer system, the duty cycle at which the discharge/boost switch 308 and the charge/inversion switch 310 are operated effects the magnitude of power transferred between the transmit coil and a receive coil of an electronic device.

Figure 5:
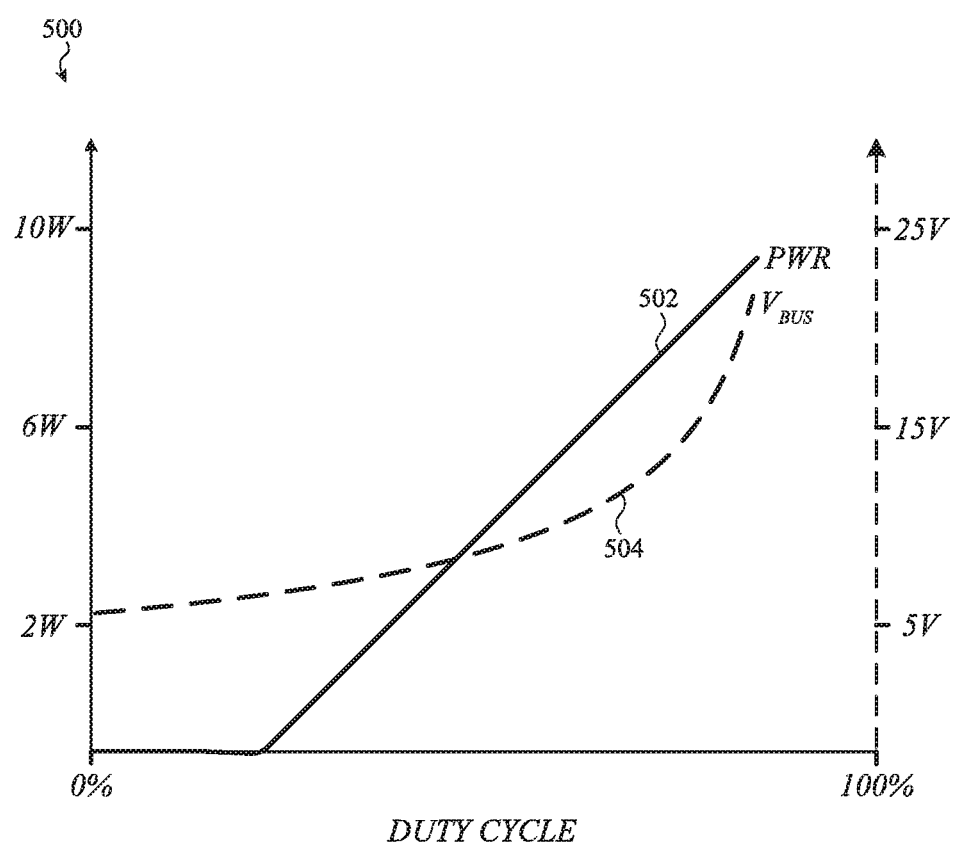
FIG. 5 is a simplified graphical representation of voltage across an output capacitor of a boosted-output inverter, such as described herein.

For example, FIG. 5 depicts an example graphical representation of voltage across an output capacitor/bus capacitor of a boosted-output inverter. In particular, the graphic 500 shows an example relationship between power output from a secondary tank inductor, depicted as the solid line 502, and voltage across a bus capacitor/output capacitor, depicted as the dotted line 504, that regulates the voltage across the secondary tank inductor during the discharge cycle of the primary tank inductor of the boosted-output inverter.

The foregoing embodiments depicted in FIGS. 3A-5 and the various alternatives thereof and variations thereto are presented, generally, for purposes of explanation, and to facilitate an understanding of boosted-output inverters, such as described herein. However, it will be apparent to one skilled in the art that some of the specific details presented herein may not be required in order to practice a particular described embodiment, or an equivalent thereof.

For example, a boosted-output inverter such as described herein can be incorporated into a number of electronic devices or power conversion systems. For example, as noted above with respect to other embodiments described herein, a boosted-output inverter can be incorporated into a transmitter of a wireless power transfer system. In these embodiments, the operation of the boosted-output inverter can be controlled based on one or more parameters or configurations of the wireless power transfer system.

Figure 6:
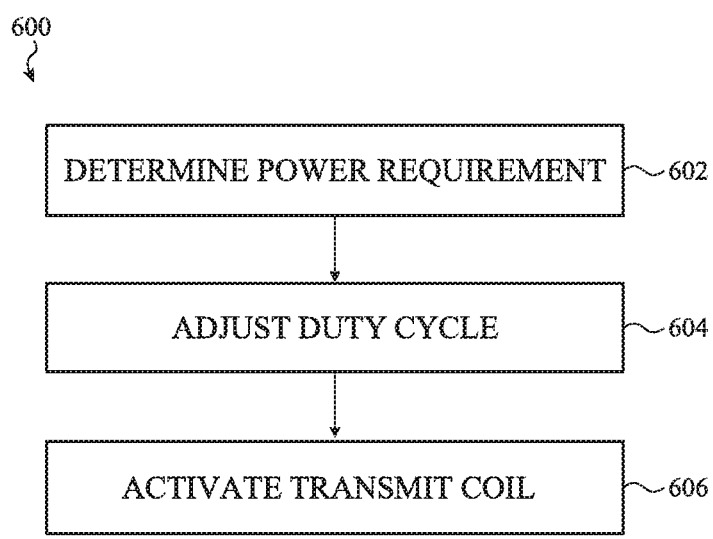
FIG. 6 is a flow chart corresponding to a method of operating a boosted-output inverter such as described herein.

For example, FIG. 6 depicts a flow chart corresponding to a method 600 of operating a boosted-output inverter with a wireless power transfer system, such as described herein. In many cases, the method 600 can be performed by a controller, a processor, a circuit, or a combination thereof included within—or in communication with—a transmitter of the wireless power transfer system, such as the transmitter 102 depicted in FIG. 1.

The method 600 beings at operation 602 in which a power requirement is determined. The power requirement may be an amount of power required by a receiver device at a particular time or, in other cases, the power requirement may be an amount of power required by multiple receiver devices. The power requirement can correspond to a voltage, a current, or a measurement of power output from the boosted-output inverter.

At operation 604, a duty cycle of the boosted-output inverter is adjusted based on the power requirement. In some cases, the duty cycle may be increased. In other cases, the duty cycle may be decreased. In still further embodiments, the frequency associated with the duty cycle may be changed—either increased or decreased. In one particular example, a power requirement may correspond to an increase in power transferred from the transmitter to the receiver. In this example, the duty cycle may be increased.

At operation 606, a transmit coil of the transmitter of the wireless power transfer system may be activated. As noted above with respect to FIGS. 3A-3C, a selection switch (e.g., such as the selection switch 320) may be enabled in order to activate the transmit coil. In other cases, more than one transmit coil can be activated at operation 606. In still further embodiments, multiple transmit coils may be activated in different phases such that current through each transmit coil is individually controlled (e.g., phase-shifted full bridge techniques).

Figure 7:
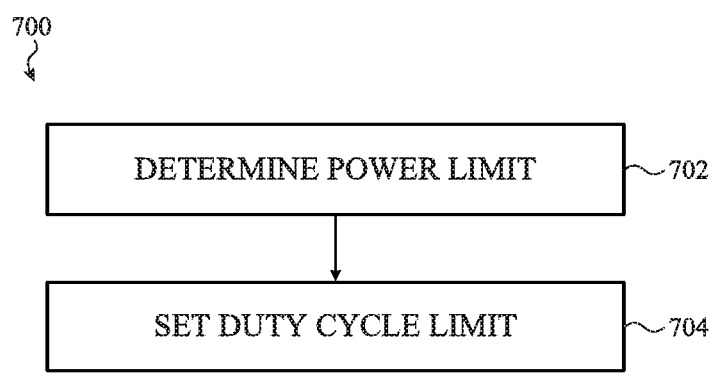
FIG. 7 is a flow chart corresponding to a method of limiting the operation of a boosted-output inverter such as described herein.

In other cases, a boosted-output inverter can be controlled in another manner. For example, FIG. 7 depicts a flow chart corresponding to a method 700 of limiting the operation of a boosted-output inverter such as described herein. In many cases, the method 700 can be performed by a controller, a processor, a circuit, or a combination thereof included within—or in communication with—a transmitter of the wireless power transfer system, such as the transmitter 102 depicted in FIG. 1.

The method 700 beings at operation 702 in which a power limit is determined. The power limit may be an amount of power that may be safely received by a receiver device at a particular time. For example, a low-profile or small-size receiver device, such as a wearable electronic device, may only be configured to receive 5 W of power whereas a larger device, such as a cellular phone, may be able to receive 10 W of power.

A particular power limit may be associated with a particular receiver device, a particular receiver device class, a receiver device mode or setting, a receiver device instruction received by a transmitter device, a user configuration or setting stored in or accessible to a transmitter device, and so on.

At operation 704, a maximum duty cycle of the boosted-output inverter is limited based on the power limit. In some cases, the duty cycle may be increased only up to the maximum duty cycle. In other cases, the duty cycle may be decreased without regard to the maximum duty cycle. In still further embodiments, the frequency associated with the duty cycle may be changed—either increased or decreased—in a manner that prevents the power limit from being exceeded.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A power converter comprising:
    a primary tank inductor comprising:
        a first input lead to receive regulated direct current from a power source; and
        a first output lead;
    a first switch comprising:
        a source lead coupled to the first output lead of the primary tank inductor; and
        a first drain lead;
    an output capacitor coupling the first drain lead of the first switch to ground;
    a second switch, comprising a second drain lead coupled to the first output lead of the primary tank inductor; and
    a secondary tank inductor comprising:
        a second input lead coupled directly to the first output lead of the primary tank inductor; and
        a second output lead coupled through a resonant capacitor to ground.

2. The power converter of claim 1, wherein:
    the source lead of the first switch is a first source lead; and
    the second switch comprises a second source lead coupled to ground.

3. The power converter of claim 1, further comprising a third switch coupled in series with the secondary tank inductor, interposing the resonant capacitor and ground, the third switch configured to selectively enable or disable the secondary tank inductor.

4. The power converter of claim 1, wherein:
    the secondary tank inductor is a first secondary tank inductor; and
    the power converter further comprises a set of secondary tank inductors comprising the first secondary tank inductor, each secondary tank inductor of the set of secondary tank inductors directly coupled to the first output lead of the primary tank inductor.

5. The power converter of claim 4, further comprising a set of selection switches, each selection switch in series with a respective one secondary tank inductor of the set of secondary tank inductors.

6. The power converter of claim 4, further comprising a set of secondary output capacitors, each secondary output capacitor coupling a respective one secondary tank inductor of the set of secondary tank inductors to ground.

7. The power converter of claim 1, wherein the secondary tank inductor is a transmit coil of a transformer of a wireless power transfer system.

8. The power converter of claim 7, wherein the transformer is an air gap transformer.

9. A power converter comprising:
    an output capacitor coupled to ground;
    a half-bridge comprising:
        a high-side switch coupled to ground via the output capacitor;
        a low-side switch coupled to ground directly; and
        a central node between a source of the high-side switch and a drain of the low-side switch;
    a boost inductor coupled to the central node;
    a resonant circuit comprising a secondary tank inductor directly coupled to the central node; and
    a processor coupled to the half-bridge and configured to drive the high-side switch and low-side switch at substantially opposite duty cycles and at a resonant frequency of the resonant circuit.

10. The power converter of claim 9, wherein the resonant circuit comprises a resonant capacitor coupling an output node of the secondary tank inductor to ground.

11. The power converter of claim 9, wherein the processor is configured to increase a duty cycle of the high-side switch to increase current in the resonant circuit.

12. The power converter of claim 9, wherein the processor is configured to transition the high-side switch from a closed state to an open state when voltage across the high-side switch is substantially equal to zero volts.

13. The power converter of claim 9, wherein:
    the resonant circuit is a first resonant circuit; and the power converter further comprises a second resonant circuit parallel to the first resonant circuit.

14. The power converter of claim 9, wherein the processor is configured to limit a duty cycle of the high-side switch based on a maximum threshold voltage of the central node.

15. The power converter of claim 9, wherein the boost inductor receives regulated direct current from a regulated direct current source.

16. A method of converting low-voltage direct current to a higher-voltage alternating current, the method comprising:
at a selectable duty cycle:
enabling a low-side MOSFET of a power converter to connect a primary tank inductor to ground; and
disabling the low-side MOSFET and enabling a high-side MOSFET to connect an output of the primary tank inductor to an input lead of a secondary tank inductor and parallel to an output capacitor; and
adjusting the selectable duty cycle to change current through the secondary tank inductor.

17. The method of claim 16, further comprising enabling a selector MOSFET to couple the secondary tank inductor to a central node between the high-side MOSFET and the low-side MOSFET.

18. The method of claim 16, wherein:
the secondary tank inductor is a first secondary tank inductor;
the selector MOSFET is a first selector MOSFET; and
the method further comprises:
enabling a second selector MOSFET to couple a second secondary tank inductor to the central node.

19. The method of claim 17, further comprising modifying the selectable duty cycle based on a maximum threshold voltage of the low-side MOSFET.

\* \* \* \* \*